United States Patent [19]
Carnell et al.

[11] Patent Number: 4,655,416
[45] Date of Patent: Apr. 7, 1987

[54] CYCLIC STICK CONSTRUCTION FOR CRASHWORTHY SEAT COCKPIT

[75] Inventors: Brian L. Carnell, Rocky Hill; Robert A. Selleck, Trumbull, both of Conn.

[73] Assignee: United Technologies Corporation, Hartford, Conn.

[21] Appl. No.: 737,011

[22] Filed: May 23, 1985

[51] Int. Cl.⁴ .............................................. B64D 25/04
[52] U.S. Cl. ..................................... 244/121; 244/141;
244/234; 244/122 R; 297/216
[58] Field of Search ........ 244/122 R, 122 A, 122 AF,
244/122 AH, 141, 121, 234, 229; 280/750, 753;
297/216; 180/271, 272, 274, 281

[56] References Cited
U.S. PATENT DOCUMENTS

| 1,806,716 | 5/1937 | Seaton | 244/229 |
| 2,272,817 | 2/1942 | Palmer | 244/229 |
| 3,556,550 | 1/1971 | Franchini | 280/750 |
| 4,085,963 | 4/1978 | Bullerdieck | 297/216 |

Primary Examiner—Galen Barefoot
Assistant Examiner—Lynn M. Fiorito
Attorney, Agent, or Firm—Russell M. Lipes, Jr.

[57] ABSTRACT

A crashworthy helicopter cockpit having a pyrotechnic system actuated by a stroking pilot seat for repositioning the upper portion of the cyclic control stick upon a severe or crash landing that is independent of aircraft electric and hydraulic systems.

7 Claims, 6 Drawing Figures

COCKPIT HEEL REST LINE

COCKPIT HEEL REST LINE

CYCLIC STICK CONSTRUCTION FOR CRASHWORTHY SEAT COCKPIT

DESCRIPTION

1. Technical Field

This invention relates to the construction of a cyclic stick for integration with a stroking seat in a helicopter cockpit to improve the crash safety of the occupant.

2. Background Art

Concern for the safety of helicopter pilots to protect them in the event of an extremely rough landing or crash impact has resulted in the development of what are known as crashworthy stroking seats. The major construction feature of these pilot seats permits a downward travel of the seat of the order of a foot or so from its normal position. This downward travel or stroking is controlled by an energy absorber system that connects the movable seat bucket to the fixed seat frame. Because of this downward motion, there is risk of injury to the occupant, because of facial impact with the cyclic stick.

Some crashworthy seats that are designed for retrofit of older helicopters limit the loads on the seat support structure such as the seat tracks. These seats incorporate additional load limiting devices that allow forward motion of the seat when the load on the seat and the occupant reaches a predetermined value. Motion of the pilot within the seat restraint system both downward and forward in addition to the motion of the seat, may further increase the risk of contact between the pilot's face and the cyclic stick. The position of the cyclic stick, normally held by the pilot's right hand, is indeterminate, particularly in accidents that result in rotor blade contact with large trees or with the ground with feedback through the control system that sometimes causes rapid uncontrolled motions of the cyclic stick. Very large motions of the head in both forward and downward directions occur as the seat strokes, and the face can strike the cyclic stick during such motions.

Examples of prior art in the field are Kenigsberg et al U.S. Pat. Nos. 4,003,534; Campbell 4,358,154 and 4,408,738 Mazelsky and 4,423,848.

DISCLOSURE OF THE INVENTION

An object of the invention is the provision of a crashworthy pilot cockpit affording protection to a pilot.

Another object of the invention is to provide a helicopter cockpit having a stroking seat and cyclic stick arrangement with a pyrotechnic system for repositioning the cyclic stick upon a severe or crash landing.

Still another object of the invention is the provision in a crashworthy helicopter cockpit of a pyrotechnic system actuated by a stroking seat for repositioning the cyclic control stick that is independent of all electric, hydraulic and other aircraft systems and that will not be initiated in any flight conditions. Further, the system is essentially maintenance free and does not require the use of flagged alerts.

The foregoing and other objects, features and advantages will be apparent from the specification and claims and from the accompanying drawings that illustrate an embodiment of the invention.

BEST MODE FOR CARRYING OUT THE INVENTION

Figure 1:
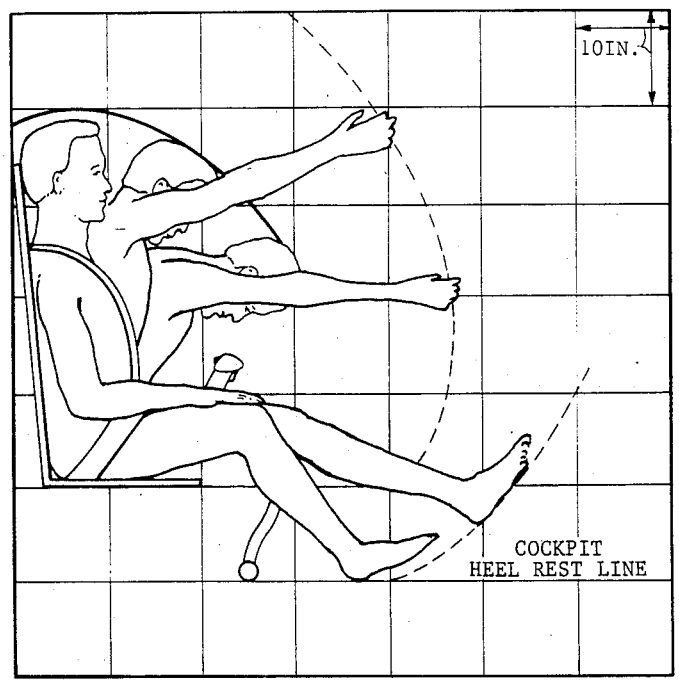
FIG. 1 is a showing of a head and extremity strike envelope-side view with the pilot fully restrained and the seat in its normal position.
Figure 2:
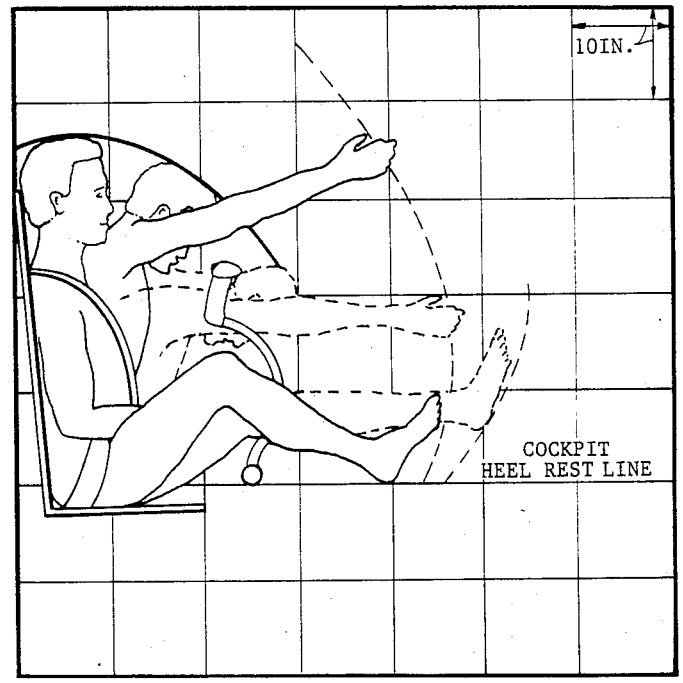
FIG. 2 is a showing of a head and extremity strike envelope-side view with approximately one foot downward stroking of the pilot's seat.

A body extremity strike envelope for a military helicopter pilot wearing a restraint system is shown in FIG. 1, and the effect of stroking the pilot's seat vertically through a distance of about one foot is shown in FIG. 2. The risk of head injury due to the pilot's head striking the cyclic control stick is obvious.

Figure 3:
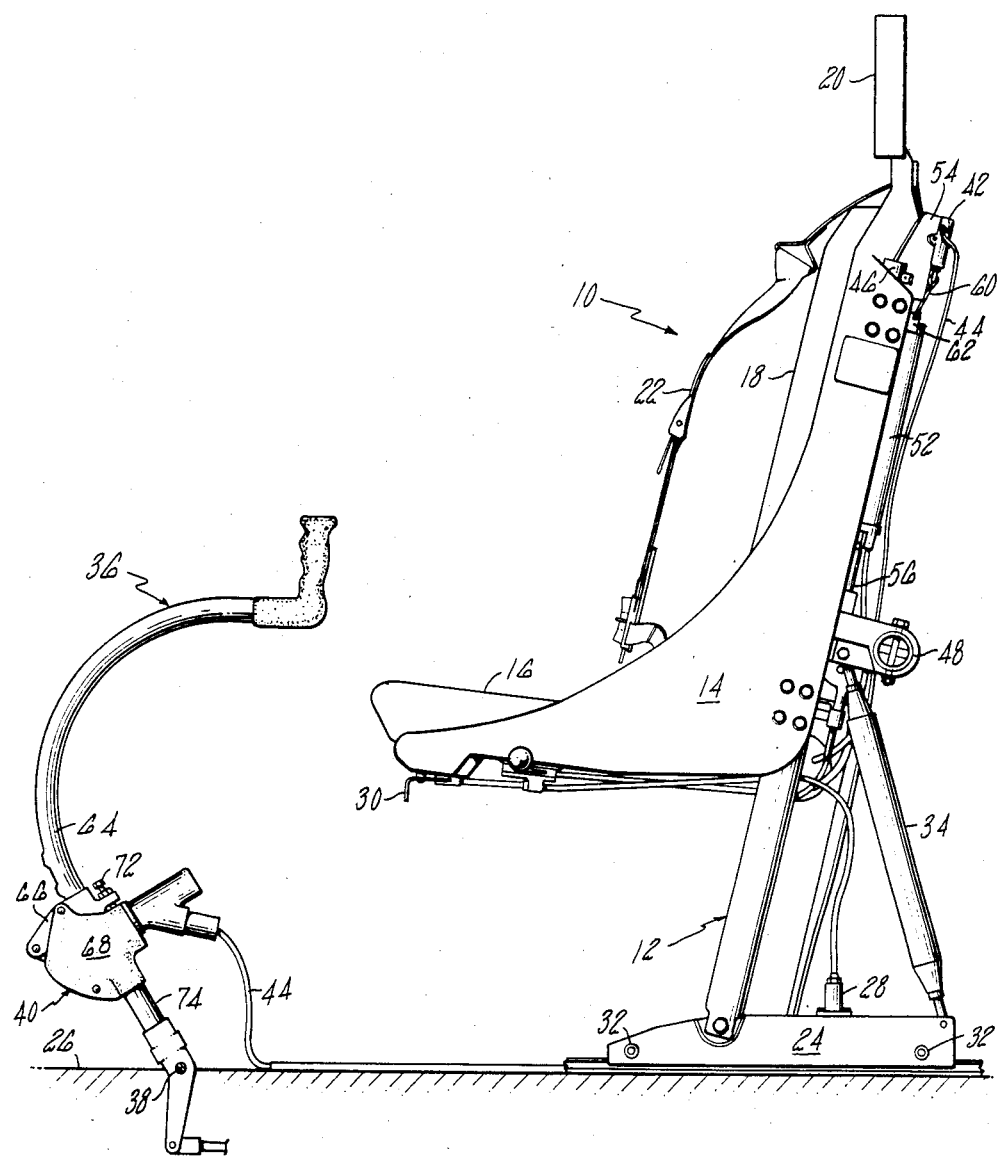
FIG. 3 is a side view of a crashworthy pilot seat showing the cyclic control stick and the pyrotechnic connection between the seat and the stick.

In FIG. 3, pilot seat assembly 10 consists of frame 12 and bucket 14. The seat has bottom 16, back 18, headrest cushions 20 and restraint strap system 22. The seat frame includes two basemembers, one of which is shown at 24, that interface with tracks on cockpit floor 26 of a helicopter. Longitudinal adjustment of the seat is achieved by releasing spring loaded adjustment devices 28 in each basemember. The devices are activated by control handle 30 under the left side of the seat, and the seat can then move on rollers 32 to the desired position along the floor. Load limiting struts at the rear of the seat, one of which is shown at 34, are attached to the midportion of the seat frame and the rear of the basemembers. These struts maintain proper seat geometry in normal usage and, in the case of a forward or combined forward and lateral crash acceleration, elongate at a constant load to limit the forces applied to the helicopter floor.

Cyclic control stick 36 is shown in position in front of pilot seat 10. The stick rotates about pivot 38 affixed to the helicopter structure at about cockpit floor level, and incorporates therein stick repositioning mechanism 40 just above the cockpit floor. Lanyard type pyrotechnic initiator 42 is attached to an energy absorber at the back of seat 10 and is connected by flexible confined detonating cord 44 to stick repositioning mechanism 40.

The pyrotechnic cord propagates a signal at detonation velocity of 5000 to 8000 meters per second. A typical cord is comprised of a center pyrotechnic core called a confined detonation fuse surrounded by a flexible plastic housing. The confined detonation fuse typically is comprised of an explosive such as hexanitrostilbene encased in a woven covering to protect the explosive and control the explosion when detonated. The confined detonation fuse terminates in an end fitting comprised of a booster charge that in turn initiates a base charge within a small, thin-walled metallic container. Particles of the exploded end tip container impinge on adjacent pyrotechnic material of the device to which the flexible confined detonating cord is attached. In this manner the "signal" is propagated from initiator 42 to stick repositioning mechanism 40.

Figure 4:
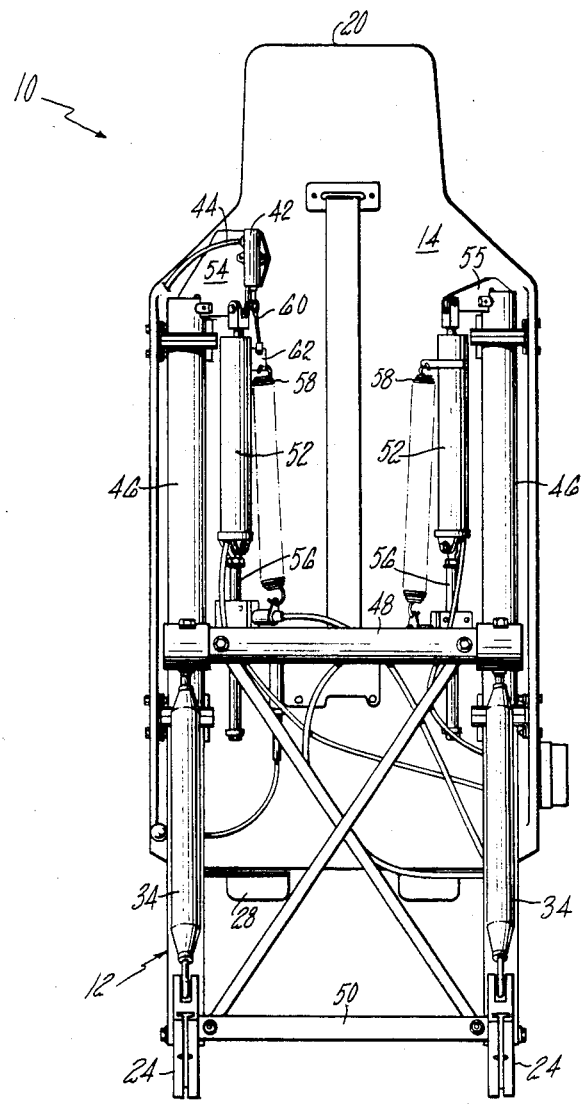
FIG. 4 is a rear view of the crashworthy pilot seat.

A rear view of seat 10 is shown in FIG. 4. Frame 12 includes guide tubes 46, middle crossmember 48, lower crossmember 50 and basemembers 24. The guide tubes serve as races for seat bucket linear bearing assemblies for vertical translation of the bucket on the frame during the vertical energy absorbing stroke in the event of a crash landing. Two variable load energy absorbers 52 restrain the seat in its vertical position and are attached through brackets 54 and 55 to the upper ends of guide tubes 46 and to vertical adjustment mechanism 56 attached to the seat bucket back. Vertical inertial crash loads at a load factor of about 14.5 g's force the seat bucket down the guide tubes against the resistance of the energy absorbers, producing an energy absorbing stroke in that direction. Counterbalance springs 58 are connected between the energy absorbers and the lower end of the seat bucket and serve to carry the weight of the movable part of the seat during vertical adjustment.

The pyrotechnic initiator is installed on the seat in a manner that the stroking of the seat during progress of an accident will cause a lanyard attaching pin to be pulled, resulting in a firing pin inside the initiator being forcibly driven into a primer that in turn initiates a pyrotechnic transfer charge effecting initiation of the flexible confined detonating cord. The body of initiator 42 is installed on bracket 54, a nonmovable structure of the seat. Lanyard 60 extends between the initiator and flange bracket 62 attached to the movable outer casing portion of energy absorber 52. A direct connection of the lanyard would effect almost immediate initiation of stick repositioning mechanism 40, or a connection having a slack length would provide for an amount of seat stroking before initiation of the stick repositioning mechanism. For stroking seat systems that include forward stroking capability as well as vertical capability, initiator 42 may be adapted or oriented to react to stroking in either or both directions.

Figure 5:
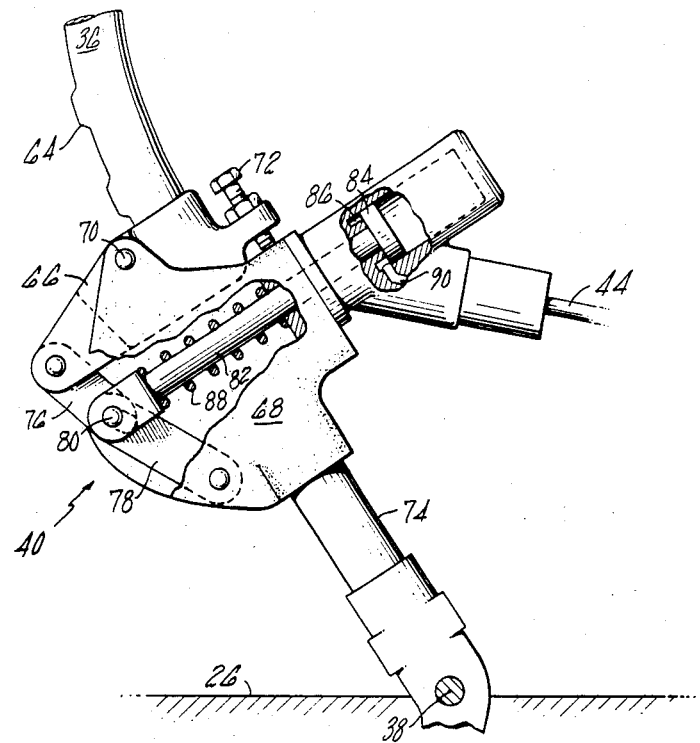
FIG. 5 is an enlarged view of the repositioning mechanism portion of the cyclic stick with the upper portion in its normal position.

The stick repositioning portion of the cyclic control stick is shown in detail in FIG. 5. The typical cyclic stick has in effect been cut into two sections at a point above the cockpit floor and the sections connected together by stick repositioning mechanism 40. Cyclic stick 36 has upper portion 64, the lower end of which is attached to bracket 66 which is pivotably connected to stick repositioning mechanism casing 68 at pivot 70. Adjustable stop 72 limits clockwise movement of upper portion 64 about pivot 70. Counterclockwise movement of upper portion 64, away from the pilot, is controlled by a linkage connection between upper portion 64 and lower portion 74. One end of link 76 is connected to bracket 66 and the other end is connected to one end of link 78 at connection 80. The other end of link 78 is connected to casing 68 which is attached to lower portion 74 of the cyclic stick.

Figure 6:
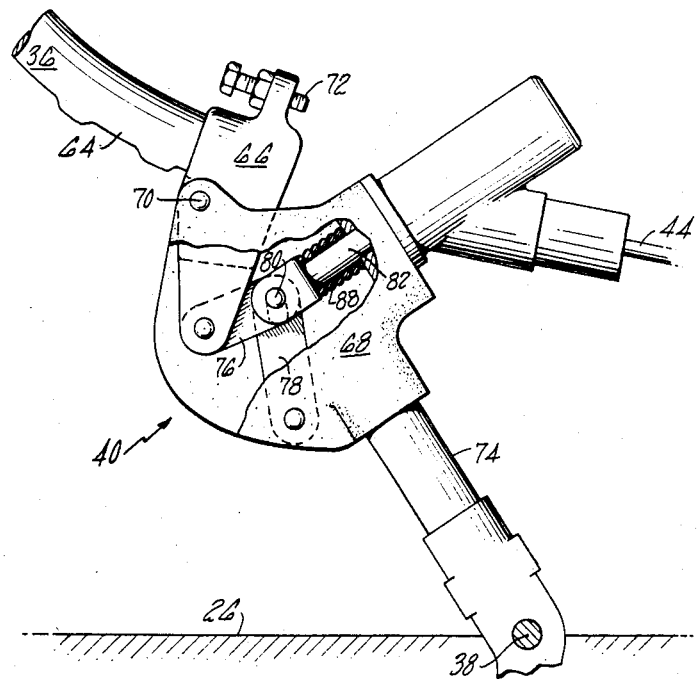
FIG. 6 is an enlarged view similar to FIG. 5 with the upper portion of the cyclic stick pivoted forward, away from the pilot.

The common link connection 80 is connected to piston rod 82 attached to piston 84 in chamber 86. Spring 88 surrounding the piston rod loads the linkage in the position shown and cyclic stick upper portion 64 in the maximum clockwise direction as determined by stop 72. Pressure generated by firing of the pyrotechnic system is admitted through passage 90 to chamber 86 at the left side of piston 84, or it may release a shear pin holding the piston in position. This pressure will result in movement of the piston to the right and the linkage and upper portion 64 will assume the position shown in FIG. 6. The linkage displacement causes bracket 66 and upper portion 64 to move in a counterclockwise direction about pivot 70, taking the cyclic stick away from the area of possible contact by the pilot's face due to downward motion of the pilot's head. Since the upper portion of the cyclic stick is hinged and not fully separated upon actuation of the pyrotechnic system, possible secondary injury from a loose stick in the cockpit is avoided by this invention. Further, the hinge and link structure of the repositioning mechanism is a constraint against stick rebound and avoids any possible injury that would have resulted from a rebound. In addition, since the pyrotechnic system is contained, the possibility of fuel vapor ignition is avoided.

It should be understood that the invention is not limited to the particular embodiment shown and described herein, but that various changes and modifications may be made without departing from the spirit or scope of this concept as defined by the following claims.

We claim:

1. A crashworthy cockpit arrangement including a pilot seat and a control stick located forward of the seat and between the pilot's legs, said seat being of the stroking type and capable of downward movement under severe loading, said control stick having means permitting displacement of the upper portion thereof away from the pilot under predetermined conditions, and means initiated by downward movement of said seat to cause said displacement of said stick portion, said initiated means being a pyrotechnic charge.

2. A crashworthy cockpit arrangement including a pilot seat and a control stick located forward of the seat and between the pilot's legs, said seat being of the stroking type and capable of downward movement under severe loading, and said control stick pivoting about a point adjacent the cockpit floor, stick repositioning means incorporated in said stick and dividing said stick into an upper portion and a lower portion, said repositioning means including means for displacing said upper portion from its normal position in a counterclockwise direction away from said seat, and means for actuating said displacing means upon downward movement of said seat.

3. A crashworthy cockpit arrangement in accordance with claim 2 in which the actuating means is a pyrotechnic system initiated by downward movement of the pilot's seat.

4. A crashworthy cockpit arrangement in accordance with claim 2 in which the repositioning means includes a linkage connection between the upper and lower stick portions for positioning the upper portion with respect to the lower portion.

5. A crashworthy cockpit arrangement in accordance with claim 2 in which the stick repositioning means is attached to the lower stick portion, the upper stick portion is pivotably connected to the repositioning means, one end of a first link is pivotably connected to said repositioning means, one end of a second link is connected to said upper stick portion and the other end of each link are pivotably connected together at a common connection, and means for actuating said linkage is connected to said common connection.

6. A crashworthy cockpit arrangement in accordance with claim 5 in which a pyrotechnic system is connected between said pilot's seat and said linkage actuating means and initiation of said pyrotechnic system upon downward motion of said pilot's seat actuates said linkage to displace said stick upper portion in a clockwise direction away from said pilot.

7. A crashworthy cockpit arrangement in accordance with claim 5 in which loading means position said linkage and upper stick portions in a normal operational position and power means, initiated by downward motion of said pilot's seat, positions said linkage upper stick in a second position in which the upper stick portion is moved to a counterclockwise position away from the pilot.

* * * * *